United States Patent [19]

Blackburn et al.

[11] Patent Number: 5,624,132
[45] Date of Patent: *Apr. 29, 1997

[54] OCCUPANT SENSING APPARATUS

[75] Inventors: Brian K. Blackburn, Rochester; Joseph F. Mazur, Washington; Scott B. Gentry, Shelby Township, all of Mich.

[73] Assignee: TRW Vehicle Safety Systems Inc., Lyndhurst, Ohio

[*] Notice: The term of this patent shall not extend beyond the expiration date of Pat. No. 5,232,243.

[21] Appl. No.: 545,902

[22] Filed: Oct. 20, 1995

Related U.S. Application Data

[60] Continuation of Ser. No. 22,341, Feb. 24, 1993, Pat. No. 5,494,311, which is a division of Ser. No. 682,908, Apr. 9, 1991, Pat. No. 5,232,243.

[51] Int. Cl.$^6$ .............. B60R 21/22; B60R 21/32
[52] U.S. Cl. .............. 280/735; 180/273; 340/667
[58] Field of Search .............. 280/735, 734, 280/730.1, 732, 728.1; 180/273; 340/667, 438, 457.1

[56] References Cited

U.S. PATENT DOCUMENTS 3,672,699  6/1972  DeWindt .............. 280/735

FOREIGN PATENT DOCUMENTS 357225  3/1990  European Pat. Off. .......... 280/730.1

OTHER PUBLICATIONS

"Kynar Piezo Film Technical Manual", Penwalt Corporation. 1987.

"Force and Position Sensing Resistors: An Emerging Technology", Interlink Electronics. Feb. 1990.

*Primary Examiner*—Brian L. Johnson
*Assistant Examiner*—Peter C. English
*Attorney, Agent, or Firm*—Tarolli, Sundheim, Covell,Tummino & Szabo

[57] ABSTRACT

An occupant sensing apparatus for use in an occupant restraint system comprises a film having an electrical characteristic with changeable states and a contact member. When an occupant sits in a vehicle seat, the contact member pushes on the film and changes the state of the electrical characteristic. An electric circuit is connected to the film for providing a first signal when the film indicates an occupant is not present, a second signal when an occupant is present, and a third signal if the film and the circuit become disconnected. The occupant restraint system is enabled when either an occupant is present or an electrical fault condition occurs. In accordance with another embodiment of the invention, an array of sensors located in the seat determines the occupant's position and weight and controls deployment of the occupant restraint system in response to the determined position and weight.

5 Claims, 14 Drawing Sheets

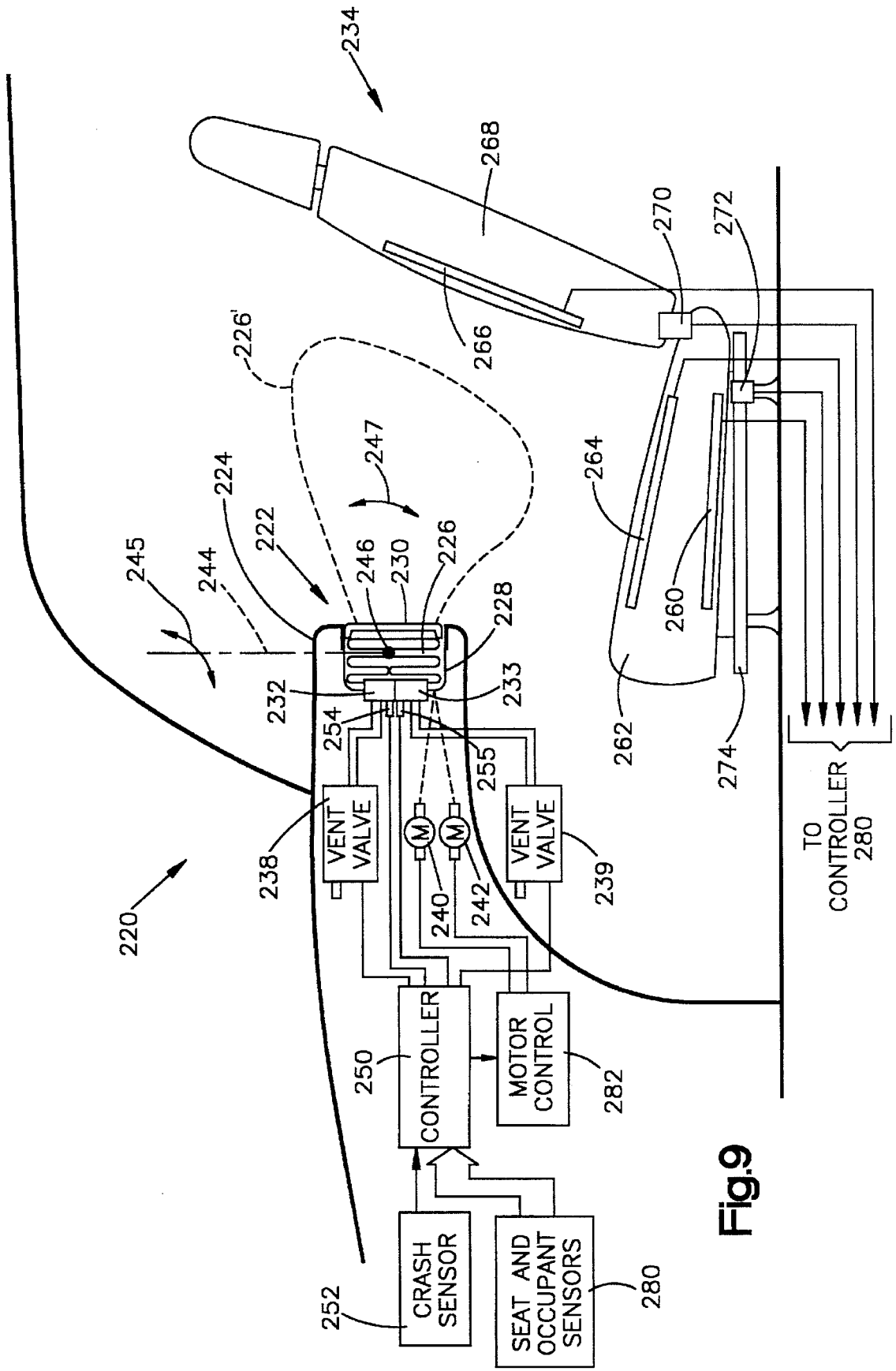

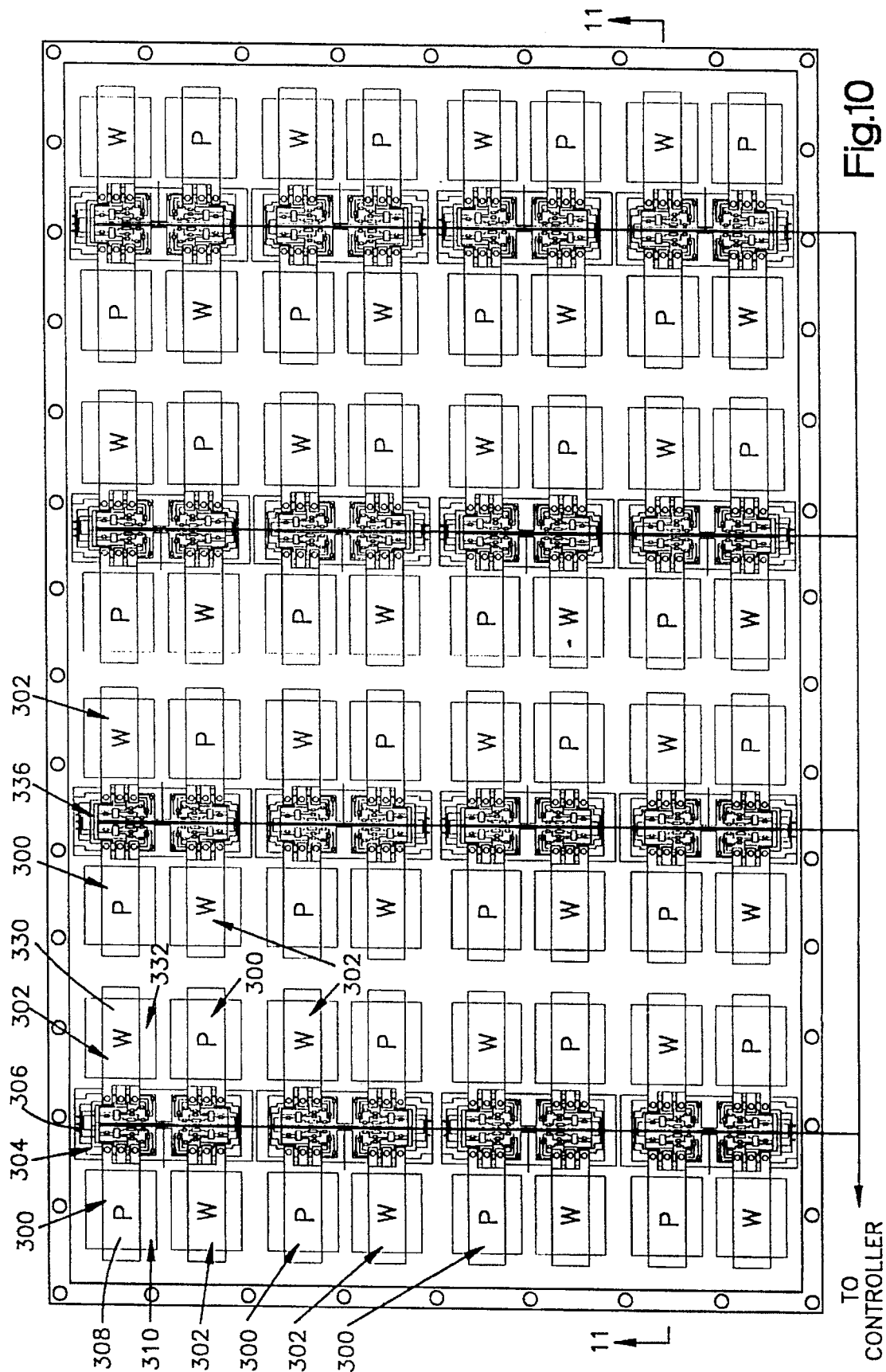

OCCUPANT SENSING APPARATUS

This is a continuation of application Ser. No. 08/022,341, now U.S. Pat. No. 5,494,311, filed on Feb. 24, 1993, which is a divisional of 07/682,908, filed Apr. 9, 1991, U.S. Pat. No. 5,232,243.

TECHNICAL FIELD

The present invention is directed to a vehicle occupant restraint system and is particularly directed to an occupant sensing apparatus in an occupant restraint system.

BACKGROUND OF THE INVENTION

Occupant restraint systems for use in vehicles are well known in the art. One such restraint system includes a crash sensor, an inflatable airbag, and an actuation circuit that controls deployment of the airbag in response to an output from the crash sensor. The crash sensor can be an accelerometer that provides an electrical signal having a value functionally related to the vehicle's deceleration. The actuation circuit includes a squib operatively connected to a source of inert gas.

During a crash condition of a vehicle, the vehicle's accelerometer provides a signal indicative of such crash condition. The actuation circuit thereby applies a current through the squib which causes the squib to ignite. When the squib ignites, the source of inert gas discharges gas into the airbag, which results in inflation of the airbag.

Certain vehicles have both a driver side airbag and a passenger side airbag ("dual airbags"). If such a vehicle is occupied only by the driver and is involved a crash, deployment of the passenger side airbag is unnecessary. Unnecessary deployment of the passenger side airbag can increase the cost of repairing the vehicle. Since a large percentage of vehicles on the highway are occupied by only the driver, it is desirable to (i) be able to detect if a passenger is present in the vehicle and (ii) deploy the passenger side airbag during a crash only if the passenger is, in fact, present.

The prior art has recognized the problem of unnecessary deployment of a passenger side airbag during a crash when no passenger is present. Prior art occupant restraint systems having dual airbags have provided various forms of occupant sensors and have enabled the passenger side airbag only when an occupant is present in the passenger seat.

SUMMARY OF THE INVENTION

The present invention is directed to a new and useful occupant sensing apparatus. An occupant sensing apparatus, in accordance with the present invention, permits detection of (i) whether a vehicle seat is occupied, (ii) whether an object in the seat is animate or inanimate, (iii) the weight of an occupant, (iv) the position of an occupant in the seat, and (v) whether there is an electrical fault condition such as an electric open or short circuit in the occupant sensor. An occupant restraint system, having the occupant sensing apparatus of the present invention, is enabled if either an occupant is present or an electrical fault condition exists in the occupant sensor. The passenger side airbag is positioned, i.e., aimed, in response to the detected position of the occupant. The deployment of the airbag is controlled in response to the weight and position of the occupant.

In accordance with one embodiment of the present invention, an occupant sensing apparatus for an occupant restraint system comprises (a) a film having an electric characteristic with changeable states, and (b) a contact member. Means are provided for mounting the film and the contact member in a vehicle so that presence of an occupant effects physical contact between the contact member and the film. The electrical characteristic of the film has a first state when there is no contact between the film and contact member and a second state when there is contact between the film and the contact member. Electric circuit means are connected to the film for providing a first signal when the film has the first state indicative of an occupant not being present, a second signal when the film has the second state indicative of an occupant being present, and a third signal when the film does not have the first or second state, thereby indicating that an electrical fault condition exits. The sensor further includes means for enabling the occupant restraint system when either the second signal or the third signal is provided by the electric circuit means.

In accordance with a preferred embodiment, the film is a piezoelectric film. The electric circuit means provides an unstable feedback loop around the piezoelectric film so that the film provides an electric output signal that oscillates. Contact between the contact member and the film effects a change in the output signal from the film. The electric circuit means provides the first, second, and third signals in response to the output signal from the film. Contact between the contact member and the film attenuates the oscillations. The oscillations are preferably within a predetermined frequency band and the electric circuit means includes a band pass filter designed to respond to the predetermined frequency band. The predetermined frequency is 2 kilohertz. Preferably, a plurality of such piezoelectric films are mounted in a checker-board pattern with a plurality of individual force sensing resistor films so as to monitor weight and position of the occupant.

BRIEF DESCRIPTION OF THE DRAWINGS

Further features of the present invention will become apparent to those skilled in the art to which the present invention relates from reading the following specification with reference to the accompanying drawings, in which:

FIG. 9 is a schematic of an occupant restraint system made in accordance with another embodiment of the present invention;

FIG. 10 is a top plan view of the occupant position and weight sensor shown in FIG. 9;

DESCRIPTION OF PREFERRED EMBODIMENT

Figure 1:
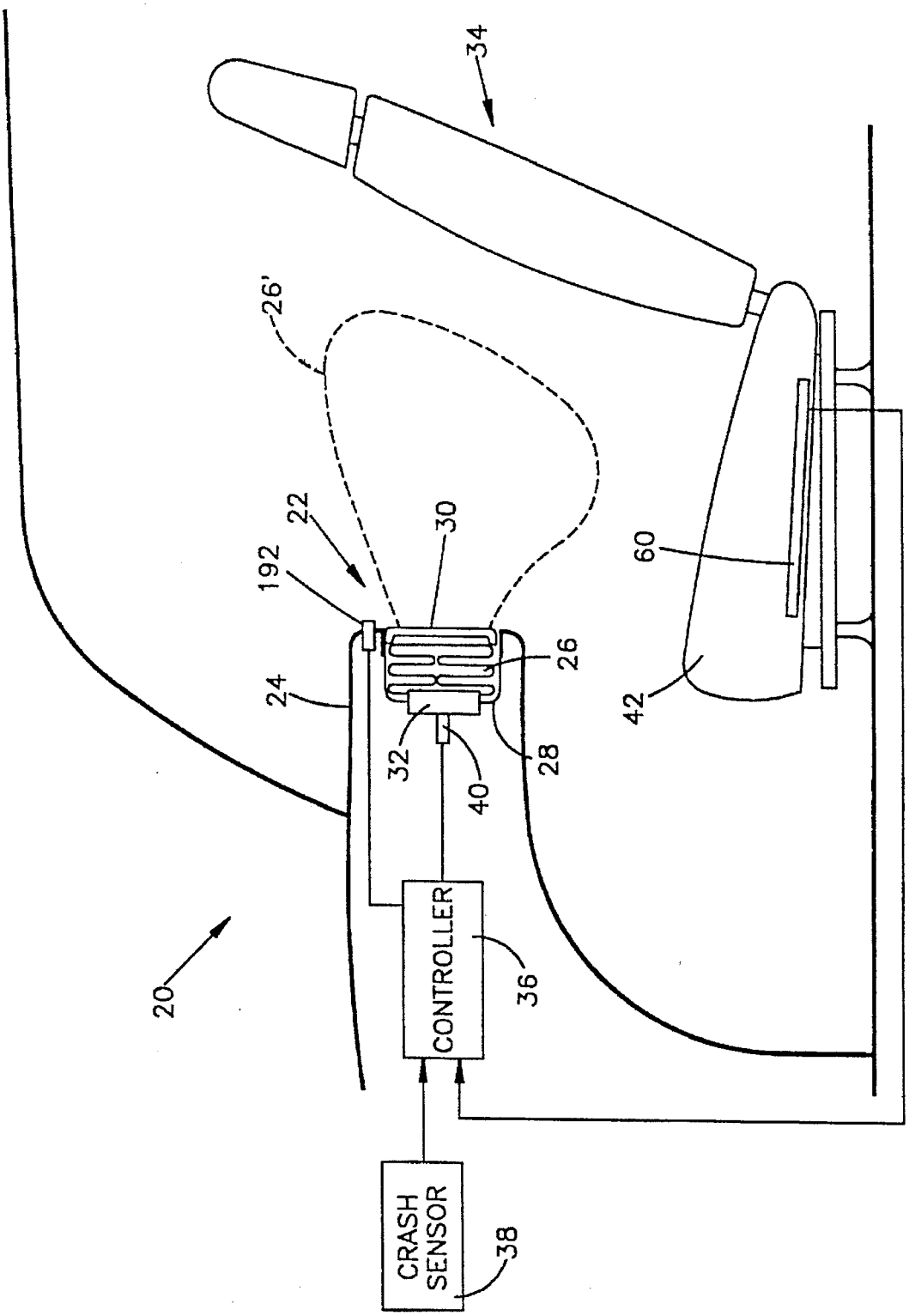
FIG. 1 is a schematic of an occupant restraint system made in accordance with one embodiment of the present invention.

Referring to FIG. 1, an occupant restraint system 20 includes an airbag assembly 22 mounted in an opening of a dashboard 24 of a vehicle. The airbag assembly 22 includes an airbag 26 folded within the interior of an airbag housing 28. A cover 30 covers the airbag and is adapted to open-easily upon inflation of the airbag 26.

A source 32 of inert gas is mounted at the back of the housing 28 and is operatively connected to the airbag 26. Gas discharged from the source 32, which may be generated by combustion of pyrotechnic material or simply released from a pressurized container, fills the airbag 26 to its inflated condition 26'. Once inflated, as occurs during a vehicle crash, the airbag 26 cushions an occupant located in a vehicle seat 34.

An electronic controller 36, such as a microcomputer, is operatively connected to a vehicle crash sensor 38. The crash sensor 38 can be any of several known types. For example, the crash sensor 38 may be a mechanical inertia switch, such as a rolamite sensor, or an electrical accelerometer. If a normally open inertia switch closes, this is an indication that a crash is occurring. Likewise, if a signal from an electrical accelerometer reaches a predetermined level or a predetermined level for a predetermined time, this is an indication that a crash is occurring. Once the controller 36 determines that a vehicle crash is occurring for which deployment of the airbag is necessary to protect the vehicle occupants, the controller 36 ignites squib 40 which, in turn, actuates the gas source 32.

The occupant seat 34 with which the occupant restraint system 20 is used is preferably the passenger seat in the vehicle. The seat 34 includes an occupant sensor 60 located in the bottom cushion 42 of the seat 34. The occupant sensor 60 is used to control whether deployment of the airbag is to be prevented.

Figure 2:
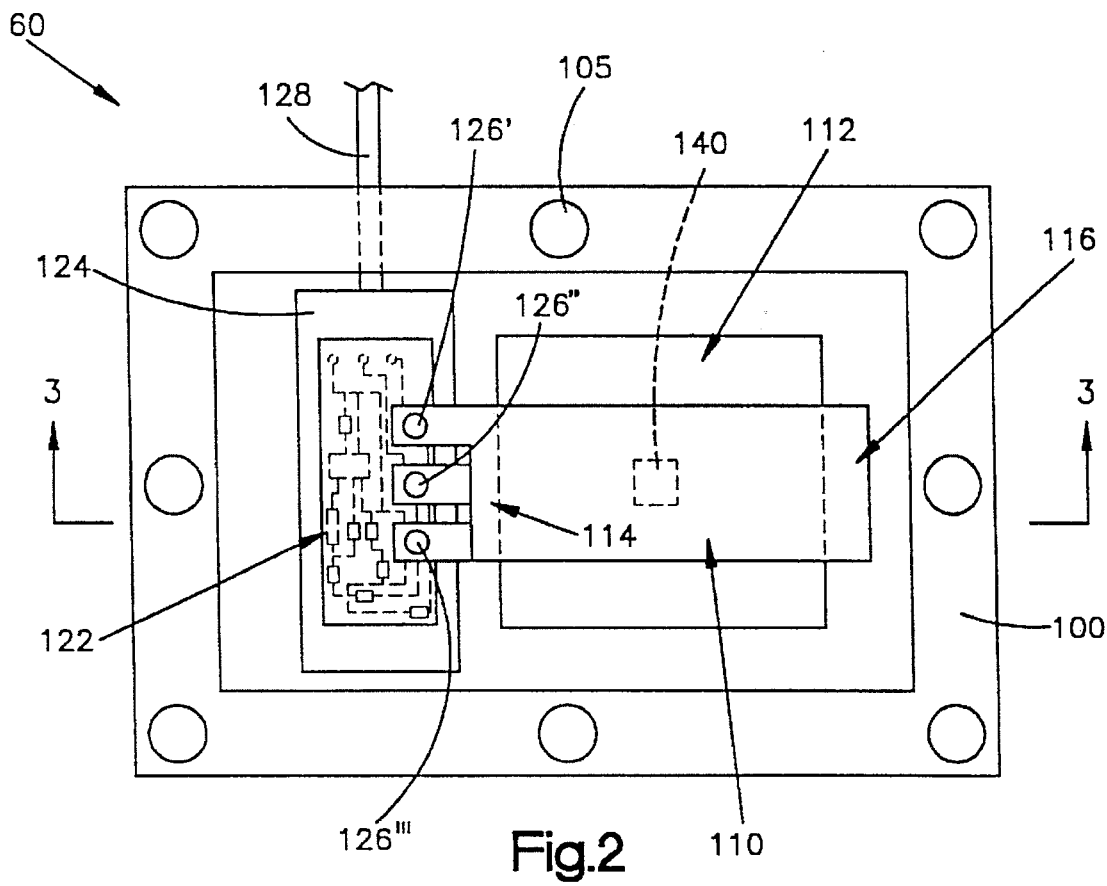
FIG. 2 is top plan view of a film sensor made in accordance with the present invention with certain parts removed for clarity.
Figure 3:
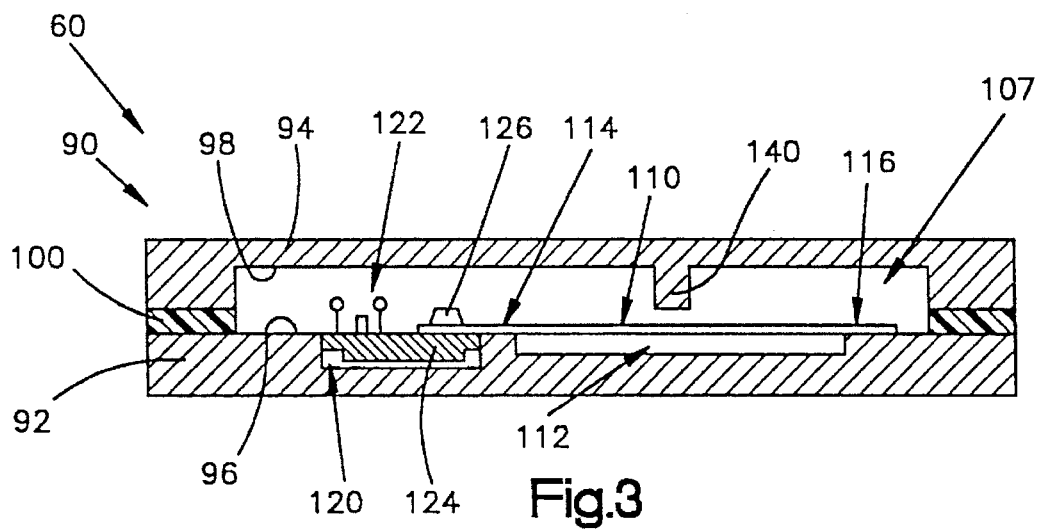
FIG. 3 is a sectional view along line 3—3 of FIG. 2.
Figure 4:
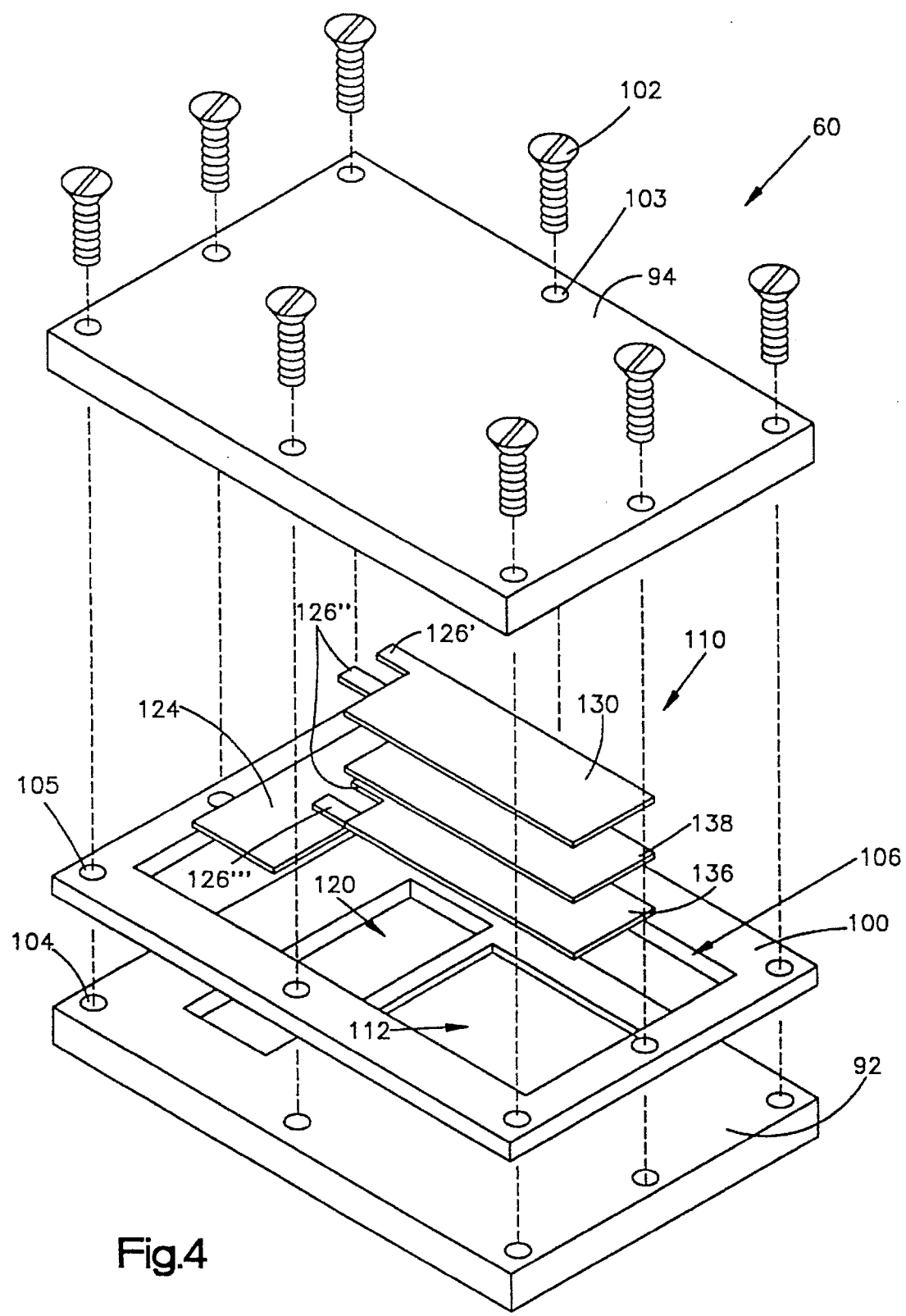
FIG. 4 is an exploded view of the film sensor shown in FIG. 2.

FIGS. 2–4 show one embodiment of the present invention, including an occupant presence sensor 60. The sensor 60 includes a housing 90 which incorporates a bottom support plate 92 and a top cover plate 94. The bottom plate 92 is rigidly mounted to a substantially inflexible bottom portion of the seat 34.

The bottom plate 92 and the top plate 94 include interior surfaces 96, 98, respectively, which are spaced apart. An annular sealing member or gasket 100 is mounted between the support plate 92 and the upper plate 94. The sealing member 100 includes a central opening 106. The plates 92, 94 are secured together by means of a plurality of spaced apart screws 102. Specifically, the top plate 94 has holes 103 and the bottom plate 92 has threaded holes 104. The gasket 100 has corresponding holes 105. The screws 102 extend through the holes 103 and 105 and are screwed into the holes 104. The bottom plate 92, the upper plate 94, and the sealing member 100 form a chamber 107 in which a piezoelectric film sensor 110 is mounted.

The bottom plate 92 includes a recessed portion 112. The piezoelectric film sensor 110 spans the recess 112 and is secured along opposed edges at locations 114, 116 by appropriate means, such as adhesive. The bottom plate 92 further includes a second recessed portion 120. A film drive circuit 122 is secured to a substrate 124 which is mounted in the recess 120 by appropriate means. The drive circuit 122 is operatively connected to the piezoelectric film sensor 110 through terminals 126. Electrical wires 128 connect the drive circuit 122 to the controller 36.

The piezoelectric film sensor 110 is a multi-layer structure including a first piezoelectric layer 130 and a second piezoelectric layer 136 separated by an insulating layer 138. The two piezoelectric layers and the insulating layer are secured together in an integral assembly by appropriate means. Each layer 130, 136 has an associated electrode silk-screened on each side of the layer. The electrodes of each piezoelectric layer 130, 136, are connected to an associated terminal 126. Specifically, the top electrode for layer 130 is connected to terminal 126'. The bottom electrode for layer 130 is connected to terminal 126". The top electrode for layer 136 is connected to terminal 126". The bottom electrode for layer 136 is connected to terminal 126"'.

When energized by the film drive circuit 122, portions of the piezoelectric layers, under their associated electrodes, flex. The drive circuit 122 is adapted so that the piezoelectric film sensor 110 oscillates. The film oscillation physically occurs over the recessed portion 112 of the bottom plate 92. This area of the film sensor 110 is referred to as the bridge.

The upper plate 94 includes an contact arm 140 that extends normal to the plate 94 and the surface 98 toward the film sensor 110. The upper plate 94 is made from a flexible material. When an occupant sits on the seat cushion 42, his weight is transferred through the material that makes up the seat cushion to the upper plate 94. The force applied to the upper plate 94 is functionally related to the occupant's weight. Since the bottom plate 92 is rigidly secured relative to the vehicle floor, the upper plate 94 flexes in response to the occupant's weight transferred through the seat material. As the upper plate 94 flexes, the contact arm 140 moves toward the layers 130, 136 of film sensor 110.

When no occupant is sitting on the seat cushion and the film layers are energized by the film drive circuit 122, the film oscillates. When the film oscillates, the output of the drive circuit oscillates with a certain peak-to-peak voltage value. If an occupant who has a weight greater than a predetermined weight then sits on the seat cushion, the upper plate 94 flexes an amount sufficient to insure that the contact arm 140 contacts the film 110. If the arm 140 contacts the film 110, the oscillations of the film 110 are attenuated. The resultant output from the film is a DC voltage value equal to approximately one-half the peak-to-peak voltage when no occupant is sitting on the seat cushion. By monitoring the output of the film 110, the controller is provided with an indication as to whether an occupant is located on the seat cushion 42.

Figure 5:
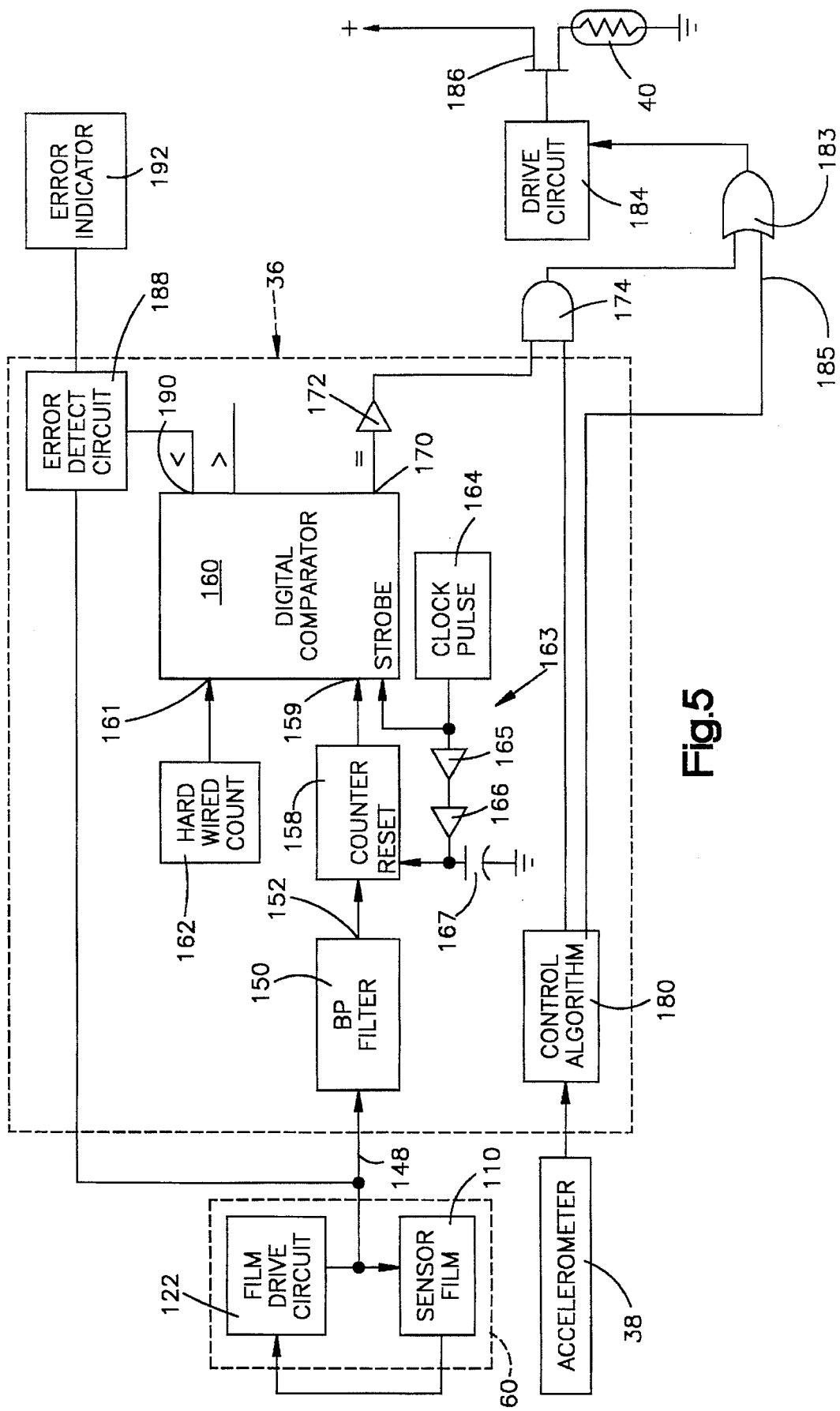
FIG. 5 is a circuit schematic of an occupant restraint system made in accordance with one embodiment of the present invention.
Figure 6:
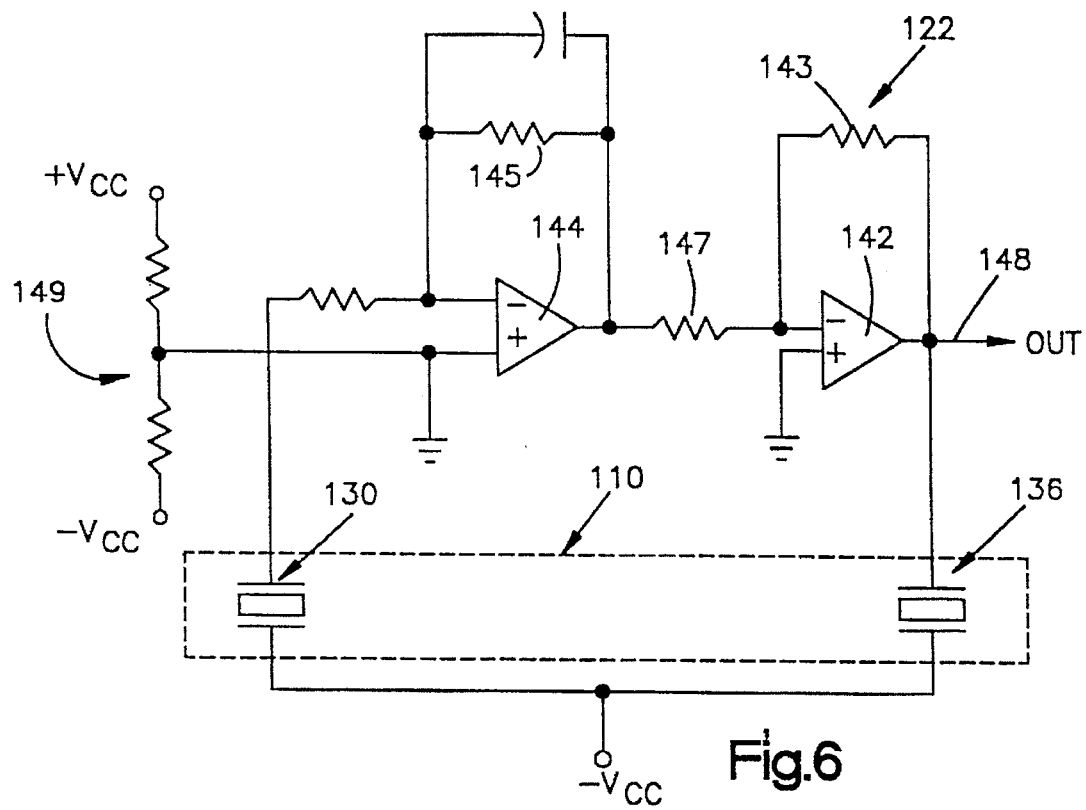
FIG. 6 is a circuit schematic showing the film drive circuit shown in FIG. 5.
Figure 7:
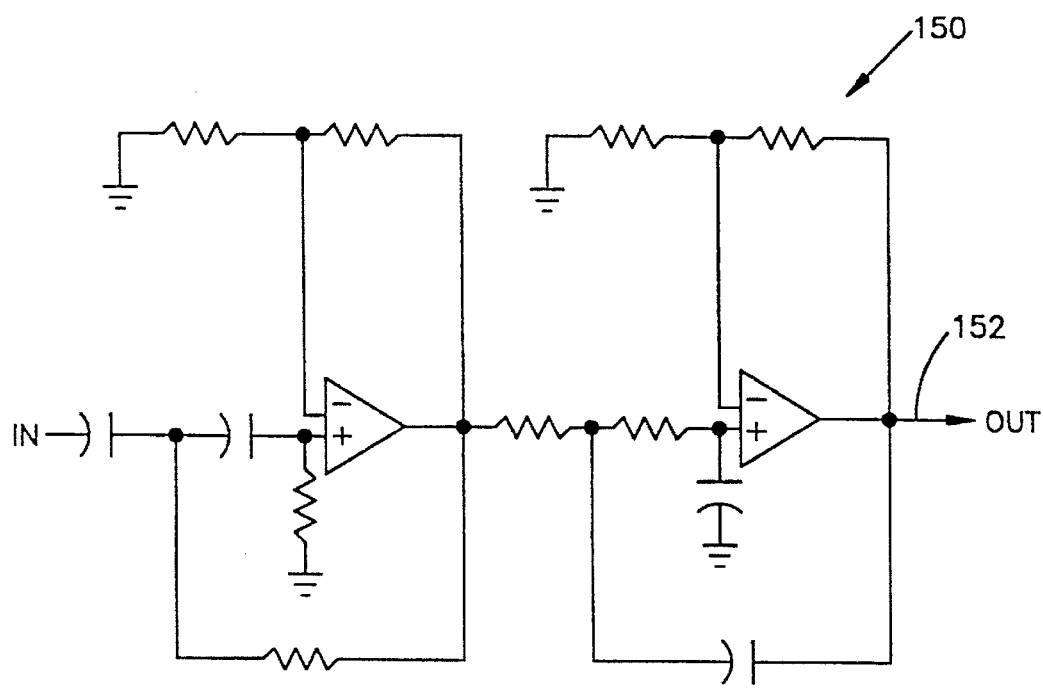
FIG. 7 is a circuit schematic showing the band pass filter circuit shown in FIG. 5.

FIGS. 5, 6 and 7, show a processing circuit, made in accordance with one embodiment of the present invention. In this embodiment, the occupant sensor is the sensor 60. The sensor 60 is used to determine whether an occupant is sitting on the seat cushion 42. The controller 36 monitors the output signal from the sensor 60. The controller 36 enables actuation of the airbag when either the signal from the sensor 60 indicates that an occupant is sitting in the seat or the absence of a signal from the sensor 60 indicates that an electrical fault condition exists such as an open or short circuit between the sensor 60 and the controller 36.

FIG. 6 shows the drive circuit 122 in detail. The top electrode of piezoelectric layer 130 is connected through terminal 126'to the inverting input of an op amp 144, connected as a differentiator, through a resistor. The differentiator with op amp 144 has a feedback resistor 145. The output of the op amp 144 is connected to the inverting input of an op amp 142, connected as an amplifier, through an input resistor 147. The amplifier 142 includes a feedback resistor 143. The output of the amplifier is connected to the bottom electrode of piezoelectric layer 136 through terminal 126'''. The bottom electrode of piezoelectric layer 130 and the top electrode of piezoelectric layer 136 are connected to a source of electrical energy $-V_{cc}$ through terminal 126''. The noninverting inputs for the amplifiers 142, 144 are connected to a common ground having a voltage value between $+V_{cc}$ and $-V_{cc}$ established through a resistor divider network 149 with equal value resistors. If the vehicle battery is used as the source of electrical energy, $-V_{cc}$ is ground of the battery, and $+V_{cc}$ is the positive 12 VDC of the battery. Therefore, the common ground of the circuit 122 is at +6 VDC.

The layers 130 and 136 have a predetermined amount of capacitance across their associated terminals. The layers 130, 136 have a capacitance of 1.5 nanofarads. The amplifier 142 with resistors 143, 147 has an extremely large gain. Because the amplifier 142 has a greater than 0 db gain at 180 degree phase shift, the output 148 of the amplifier 142 will oscillate at a frequency equal to:

$$freq. = \frac{1}{2\Pi RC}$$

where R is the value of resistor 145 and C is the series connected value of the capacitances of the layers 130, 136. In the example given, the series capacitance is 0.75 nanofarads. In a preferred embodiment of the present invention, an output voltage is provided at a terminal 148 having a frequency of approximately 2 kilohertz. It should be noted that the continuous oscillations at the output of the film drive circuit 122 are dependent upon the freedom of the layers in the film 110 to move.

Because the capacitance values of the piezoelectric layers are used as component values in the drive circuit 122, the circuit must be placed in close proximity to the piezoelectric film 110 to avoid line capacitance that would occur in long lead lines. The drive circuit 122 is placed upon the substrate 124 so as to be close to the film 110.

The output 148 is connected to the input of the controller 36. The controller 36 includes a bandpass filter 150, of standard design well known in the art, connected to the output 148 of the film drive circuit 122. The bandpass filter 150 is designed, in accordance with a preferred embodiment of the present invention, to pass frequencies of 2 kilohertz.

Figure 8:
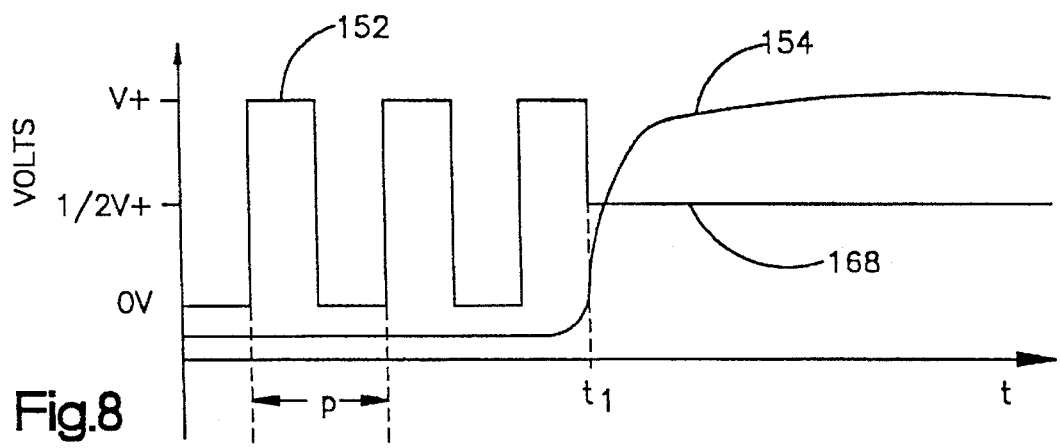
FIG. 8 is a graphical representation of the output of the band pass filter shown in FIG. 7.

The bandpass filter 150 may be external to the sensor 60 or can be placed upon the substrate 124 along with the drive circuit. As shown in FIG. 8, the output 152 of the bandpass filter is an oscillating voltage between zero volts DC (battery ground) and a voltage value V+ (the positive battery terminal) at a frequency of 2 kilohertz. The time period P between pulses is equal to 0.5 msec., which is one divided by the frequency of 2 kilohertz. The line 154 shown in FIG. 8 represents force or stress against the top plate 94 of the sensor 60 as a result of an occupant sitting on the seat cushion 42. At time $t_1$, the occupant's weight deflects the top plate 94 a sufficient amount so that the contact arm 140 contacts the film 110. When contact occurs between the arm 140 and the film 110, the output of the bandpass filter changes to a DC voltage equal to approximately one-half V+, as shown by the line 168. The voltage goes to one-half V+ because the common ground of circuits 122, 150 is at one-half V+. Specifically, V+ is the positive terminal of the vehicle battery and chassis ground is the negative terminal of the vehicle battery. Common ground for the drive circuit 122 and the band pass filter 150 is at one-half the value of the battery voltage as is shown in FIG. 6. Therefore, when the oscillations of the piezoelectric layers stop, the output of the band pass filter and the drive circuit go to their common ground value, which is one-half V+, i.e., 6 VDC.

A counter 158, also part of the controller 36, is connected to the output 152 of the bandpass filter 150 and counts the output pulses from the bandpass filter. The output of the counter 158 is connected to a first input 159 of a digital comparator 160. The second input 161 of the digital comparator 160 is connected to a hard wired count in digital form designated by 162 in FIG. 5.

The counter is wired to be periodically reset by a reset circuit 163. The reset circuit 163 includes a clock 164 connected to a reset input of the counter 158 through a delay circuit. The delay circuit includes two inverters 165, 166 and a delay capacitor 167 connected to the output of the inverter 166. The output of the clock 164 is further connected to the strobe input of the digital comparator 160.

The clock outputs a periodic pulse. For the purpose of explanation only, the pulse occurs once per second. Also, assume the count from the hard wired count is 2,000. The clock outputs a HIGH signal for the strobe and the reset of the counter 158. The delay circuit insures that the count from the counter is strobed into the digital comparator prior to the reset of the counter 158. If the counter 158 is reset once a second, the counter output at the end of that one second, i.e., just prior to reset, will be equal to a count of 2,000.

The output of the digital comparator 160 has three outputs including an output 170 which changes states based on the input of the counter 158. If no occupant is sitting on the seat cushion 42, the output of the counter 158 will be a count value of 2,000. When this occurs, the output 170 is a digital HIGH. A digital HIGH at the output 170 thereby indicates no occupant is on the seat cushion. If an occupant sits on the seat cushion 42 so that the arm 140 contacts the film 110, the output of the band pass filter 150 assumes a DC value, and the counter 158 counts zero pulses. The output 170 of the digital comparator 160 then goes to a digital LOW.

If an electrical fault such as an open or short circuit occurs in the sensor 60, the output 148 will go to a DC voltage value equal to either zero volts DC (the battery ground) or V+ (the positive battery terminal) because input noise will result in saturation of one of the op amps 142, 144. In either case, the counter will count zero pulses when an electrical fault occurs between the sensor 60 and the controller 36. Therefore, if an electrical fault occurs between the sensor 60 and the controller 36, the output 170 goes to a digital LOW.

It should be appreciated that the output 170 of the digital comparator 160 will be a digital HIGH only when (i) an occupant is not sitting on the cushion 42, (ii) the sensor film is properly operating, i.e., the sensor film is oscillating at 2 kilohertz, and (iii) all electrical wires are connected from the sensor film up to the digital comparator 160. Otherwise, the output 170 will be at a digital LOW.

The output 170 of the digital comparator 160 is connected to the input of an inverter 172. The output of the inverter 172 is connected to a first input of an AND gate 174. The second input of the AND gate 174 is connected to the output of a read-only memory 180 in the controller 36. The read-only memory 180 is connected to the output of the crash sensor accelerometer 38. A control algorithm is programmed in the read-only memory 180 to process the output of the accelerometer 38. The control algorithm can take any of several forms. For example, if the accelerometer is of the type that provides a linear electric signal indicative of sensed deceleration (crash condition), the control algorithm may integrate the accelerometer signal. Once the integral reaches a predetermined value indicative of a crash condition, the algorithm provides a digital HIGH to the AND gate 174. Thus, the controller, as a result of the algorithm 180, provides a digital HIGH signal when the signal from the accelerometer indicates that the vehicle is in a crash condition.

The output Of the AND gate 174 is a digital HIGH when a crash condition occurs and either (i) an occupant is sitting on the seat cushion 42 or (ii) an electrical fault exists between the sensor 60 and the controller 36 so that, in either case, the output of the inverter 172 is a digital HIGH. In all other situations, the output of the AND gate 174 is a digital LOW.

The output of the AND gate 174 is connected to an input of an OR gate 183. The read-only memory 180 is connected to the other input of the OR gate 183 on line 185. The read-only memory also includes a control algorithm that determines the speed of the crash. Preferably, this is accomplished by monitoring the slope of an integration curve. If the speed of the crash exceeds a predetermined value, the control algorithm provides a digital HIGH on line 185. If the speed of the crash is greater than a predetermined value or the output of AND gate 174 is a digital HIGH, the output of OR gate 183 is switched to a digital HIGH. The output of OR gate 183 is connected to a drive circuit 184. The output of the drive circuit 184 is connected to an electric switch 186, such as a field-effect transistor ("FET"). The FET 186 is connected in series with the squib 40 across a source of electrical energy. The drive circuit 184 turns the FET 186 ON when the output of the OR gate 183 is a digital HIGH. Turning the FET ON ignites the squib 40 which, in turn, actuates the gas source 32 and inflates the airbag 26. It should be understood that the controller 36 enables deployment of the airbag 26 upon the detection of both a vehicle crash condition (with crash speed less than the predetermined value) and either the presence of an occupant on the seat cushion 42 or the occurrence of an electrical open circuit between the film sensor 60 and the controller. Also, if the speed of the crash is greater than the predetermined value, the airbag is deployed by the control algorithm 180 and OR gate 183 independent of whether an occupant is present on the seat.

An error detect circuit 188, which is part of the controller 36, is connected to the output 148 of the film drive circuit 122. An output 190 from the digital comparator is connected to an enable input of the error detect circuit 188. Whenever an occupant is sitting on the seat cushion 42 or an electrical fault occurs between the sensor 60 and the controller 36, the output 190 of the digital comparator 160 is a digital HIGH. In other words, when output 170 is LOW, output 190 is HIGH. When the output 190 is HIGH, the error detect circuit 188 is enabled. When enabled, the error detect circuit monitors the output voltage at the output 148 from the film drive circuit 122. If the voltage present on the output 148 is outside of a predetermined window centered at one-half V+, an error indicator 192 located in the dash board 24 is energized to warn the vehicle operator. The voltage on output 148 being outside of the window at one-half V+ indicates that an electrical fault has occurred. If the output 148 is within the window at one-half V+, plus or minus a predetermined value, such condition indicates that an occupant is sitting on the seat cushion 42.

FIG. 9 shows an occupant restraint system 220 made in accordance with another embodiment of the present invention. The occupant restraint system 220 includes an airbag assembly 222 mounted in an opening of a dashboard 224 of a vehicle. The airbag assembly 222 includes an airbag 226 folded within the interior of an airbag housing 228. A cover 230 covers the airbag and is adapted to open easily upon the inflation of the airbag 226.

Two sources 232, 233 of inert gas are mounted at the back of the housing 228 and are operatively connected to the airbag 226. The gas sources 232, 233 may be containers of combustible gas generating material or pressurized gas. The gas sources 232, 233 are actuated by electrical squibs or initiators 254, 255. Gases discharged by actuation of the gas sources 232, 233 fills the airbag 226 to its inflated condition 226'. Once inflated, as occurs during a vehicle crash, the airbag 226 cushions an occupant located in a vehicle seat 234.

A vent valve 238 is operatively connected to the gas source 232. Similarly, a vent valve 239 is operatively connected to the gas source 233. The vent valves 238, 239 are used to control the inflation of the airbag 226. If the vent valves 238, 239 are fully closed upon actuation of the gas sources 232, 233, the airbag 226 inflates to its maximum volume, at maximum pressure and maximum inflation rate. By controlling whether one or both gas sources are actuated and by controlling the degree to which the vent valves 238, 239 are opened, the inflation rate and pressure of the airbag are controlled to values less than the maximum values.

Electric motors 240, 242 are operatively connected to the housing 228 of the airbag assembly 222. Tho motor 240 is operatively connected to the housing 228 so as to control movement of the airbag assembly 222 angularly bout a vertical axis 244 leftward or rightward, shown by arrow 245, as viewed by the occupant sitting in seat 234. The motor 242 is operatively connected to the housing 228 so as to move the airbag assembly 222 angularly about a horizontal axis 246 (normal to FIG. 9) upward or downward, shown by arrow 247, as viewed from the seat 234. The motors 240, 242 are used to control the orientation of the airbag assembly 222 relative to an occupant sitting in the seat 234.

An electronic controller 250, such as a microcomputer, is operatively connected to a vehicle crash sensor 252. The crash sensor 252 can be any of several known types. For example, the crash sensor 252 may be a mechanical inertia switch, such as a rolamite sensor, or an electrical accelerometer that provides an oscillating output signal indicative of whether the vehicle is in a crash condition. If a normally open inertia switch closes, this is an indication that a crash is occurring. Likewise, if the signal from an electrical accelerometer reaches a predetermined level or a predetermined level for a predetermined time, this is an indication that a crash is occurring.

Once the controller 250 determines that a vehicle crash is occurring for which deployment of the airbag is necessary to protect the vehicle occupants, the controller 250 ignites at least one of the squibs 254, 255 which, in turn, respectively actuates one or both of the associated gas sources 232, 233. The controller 250 is also electrically connected to the vent valves 238, 239 and controls the amount of gas bled off from the gas sources 232, 233 during inflation of the airbag 226. By bleeding off a certain amount of gas from the gas sources, the speed of deployment, the size, and pressure of the airbag 226 are controlled.

The occupant seat 234 with which the occupant restraint system 220 is used is preferably a passenger seat in the vehicle. The seat 234 includes an occupant position and weight sensor 260 located in the bottom cushion 262 of the seat 234. A humanistic sensor 264 is located near the top of the cushion 262. An occupant sensor 266 is located in the back cushion 268 of the seat 234.

The occupant position and weight sensor 260 detects (i) if an object is present on the seat, (ii) the weight of the object, and (iii) the position of the object in the seat. The humanistic sensor 264 detects whether an object on the seat cushion 262 is animate or inanimate. The occupant sensor 266 detects whether an object is contacting the back cushion 268.

In addition to the sensors 260, 264 and 266, a seat back incline sensor 270 is operatively connected between the lower cushion 262 and the upper cushion 268. The sensor 270 provides an electrical signal indicative of the angular displacement of the seat back cushion 268 relative to the vehicle floor. Preferably, the seat back incline sensor 270 is a rotary potentiometer. A seat position sensor 272 is operatively connected to the lower cushion 262 and a sliding rail 274 upon which the seat 234 is slidably mounted in a manner well known in the art. The sensor 272 provides an electrical signal indicative of the forward and backward position of the seat 234 relative to a predetermined reference point. Preferably, the seat position sensor 272 is a linear potentiometer. Based on the signal from the sensor 272, the distance from the front cover 230 to the seat back 268 can be determined.

The sensors 260, 264, 266, 270 and 272 are collectively referred to as the seat and occupant sensors 280. The seat and occupant sensors 280 are electrically connected to the controller 250. Based upon (i) the presence or absence of an object on the seat, as indicated by the sensor 260, and (ii) whether the object is animate from the sensor 264, the controller 250 determines whether or not to enable the airbag assembly 222. Based upon (i) the sensed position of the seat 234 from sensor 272, (ii) the incline of the seat from sensor 270, (iii) the weight of the occupant from sensor 260, and (iv) the position of the occupant in the seat from sensors 260 and 266, the controller 250 controls the inflation rate, size, pressure, deployment orientation and deployment timing of the airbag 226. The controller 250 controls deployment orientation through a motor control drive circuit 282 operatively connected to the airbag position motors 240, 242.

Figure 11:
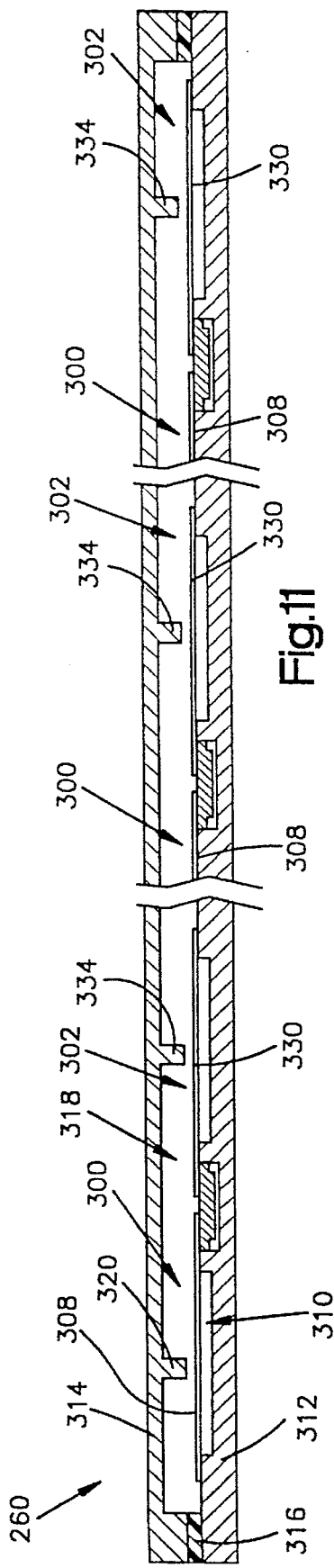
FIG. 11 is a side sectional view of the occupant position and weight sensor taken along line 11—11 of FIG. 10.
Figure 12:
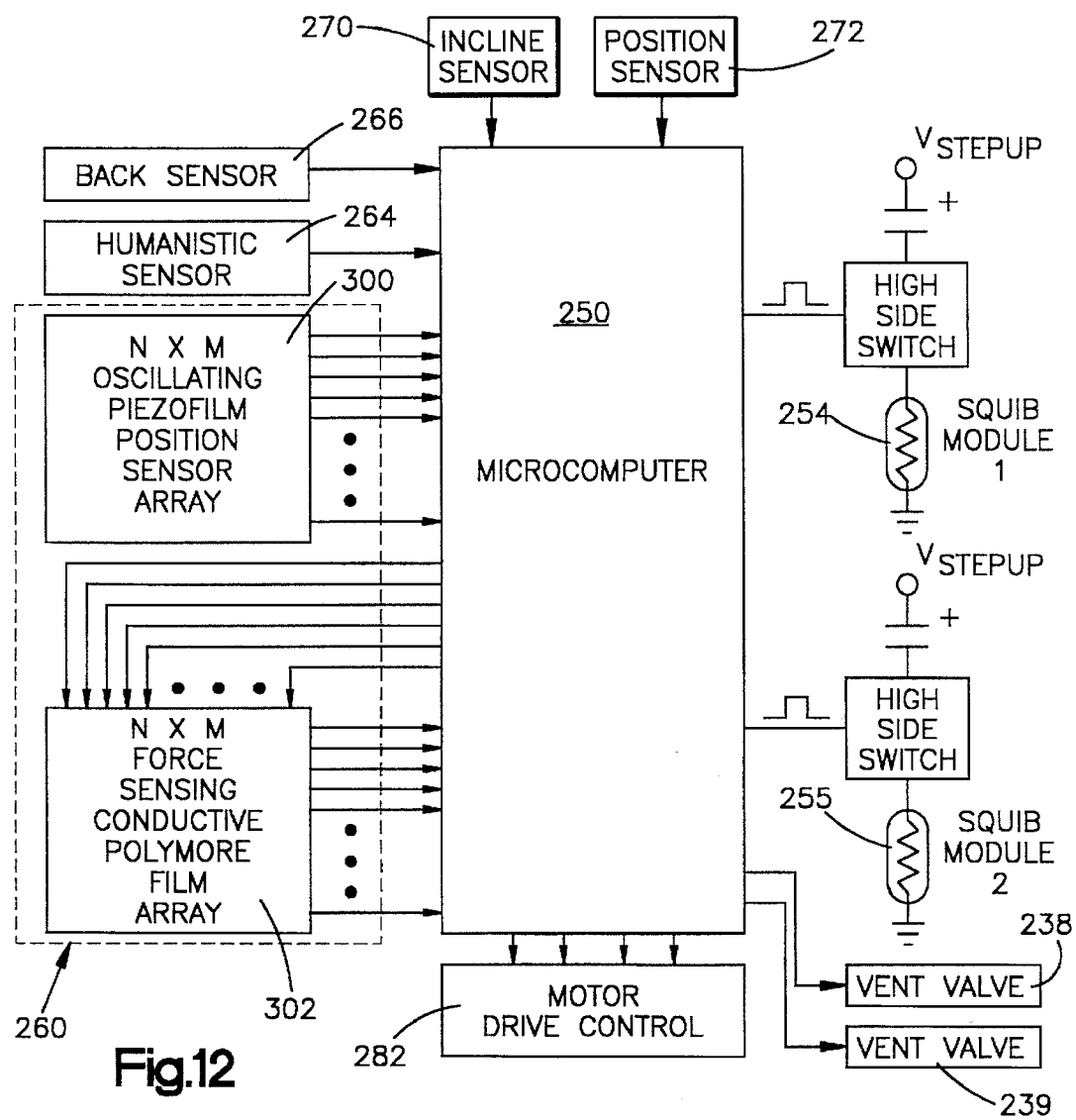
FIG. 12 is a circuit schematic of a portion of the occupant restraint system of FIG. 9.
Figure 13:
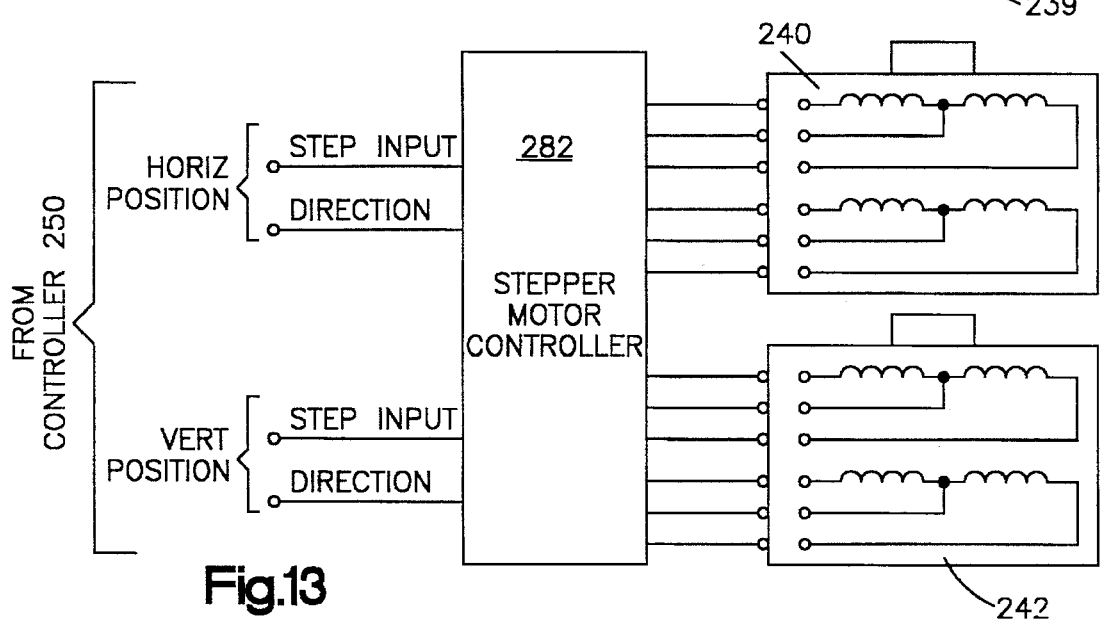
FIG. 13 is a circuit schematic of a portion of the occupant restraint system of FIG. 9.

Referring to FIGS. 10–12, the occupant position and weight sensor 260 includes an N×M array of individual position sensors 300 and individual weight sensors 302. FIG. 10 shows a specific arrangement of sensors 300, 302. The array shown is an 8×8 array with the position and weight sensors alternately positioned in the array in a checkerboard pattern. It should be appreciated that the invention is neither limited to this specific array nor pattern of sensors.

The sensors 300 are all identical in structure to the sensor 60 described with regard to FIGS. 2, 3, and 4. Each sensor 300 has its own multilayer piezoelectric film 308 and a drive circuit 304 mounted next to the film on an associated substrate 306. Each drive circuit 304 is identical to the drive circuit shown in FIG. 6 with regard to the sensor 60. The output of each drive circuit 304 is connected to the controller 250. Each film 308 is mounted across an associated recess 310 in a bottom support plate 312 that provides the recesses for all of the films. A top plate 314 which covers all of the films 308 and drive circuits 304 is secured to the bottom plate 312 by screws as described with regard to sensor 60. An annular gasket 316 is interposed between the top plate 314 and the bottom plate 312. The gasket 316, top plate 314, and bottom plate 312 form a chamber 318.

The top plate has a plurality of contact arms 320 extending downward toward the bottom plate 312. Each sensor 300 has an associated contact arm 320 located over its film 308. The top plate 314 is made from a material that flexes in response to a force or load. The amount of flexure at any point on the upper plate 314 is a function of the weight of the occupant at the corresponding location on the seat cushion 262. When a contact arm 320 contacts its associated film 308, the output signal from the associated drive circuit 304 changes in the same manner shown in FIG. 8 with regard to sensor 60. By monitoring which sensors 300 indicate the presence of an object, the position of the object in the seat 234 can be determined. Based upon this determined position, the controller 250 can control the orientation of the airbag assembly 222 and the time at which the airbag is deployed. As described with regard to sensor 60, sensors 300 also provide an indication of an electrical fault condition in the sensors such as an open circuit and a short to ground.

Each of the sensors 302 includes a force sensing film 330 mounted across an associated recess 332 in the bottom plate 312. The force sensing film, which is also referred to herein as weight sensing film, is a force sensing resistor ("FSR") film. This type of film has a predetermined amount of resistance seen across its connection terminals. The resistance across the terminals varies inversely with applied force. Like the sensors 300, each sensor 302 has an associated contact arm 334 located above the film and extending downward from the top plate 314. Each sensor 302 also has an associated drive circuit 336.

As previously mentioned, the top plate 314 is made from a material that flexes in response to an applied load or force. The amount of flexure at any point on the upper plate 314 is a function of the weight of the occupant at the corresponding location on the seat cushion 262. When a contact arm 334 contacts its associated film 330, the output signal from the associated drive circuit 336 varies as a function of the occupant's weight at that location. By monitoring the sensors 302, the weight of the occupant on the seat 234 can be determined. Based upon this determined weight, the controller 250 can control deployment of the airbag.

Figure 14:
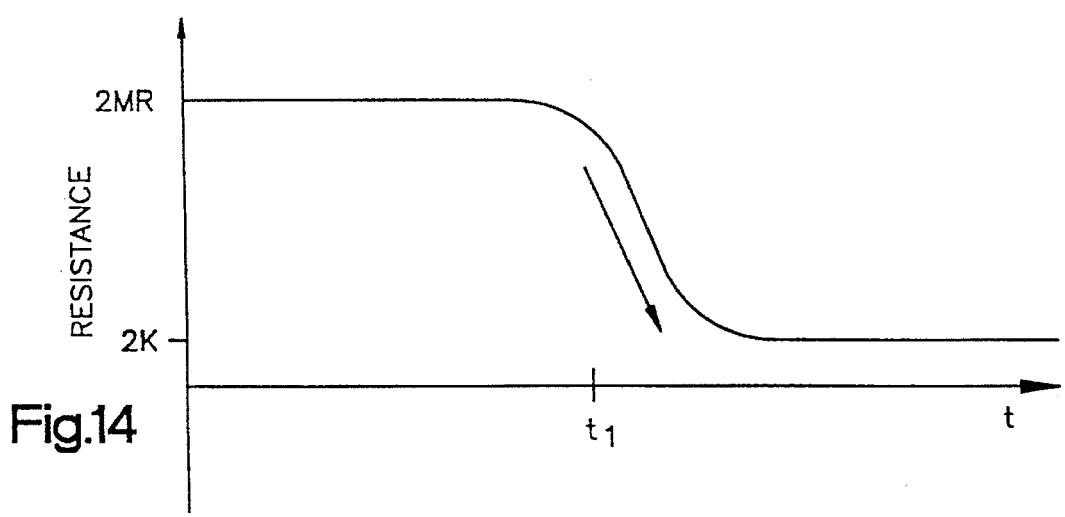
FIG. 14 is a graph of resistance of the weight sensor shown in FIG. 9.

The sensors 300, 302 are designed so that a predetermined amount of weight must first be applied to the seat cushion before the arms 320, 334 contact their associated films 308, 330. For example, it is contemplated that twenty pounds would have to be placed upon the seat cushion 262 before the arms 320, 334 would contact their associated films 308, 330. For each force or weight sensor 302, any change in resistance will be functionally related to the weight of the occupant. FIG. 14 is a graph depicting the impedance of the sensor film 330. When no weight is on the seat cushion 262, the impedance of the film is quite high. As the weight increases, the impedance decreases. The graph shows the occupant sitting on the seat at time $t_1$.

Figure 15:
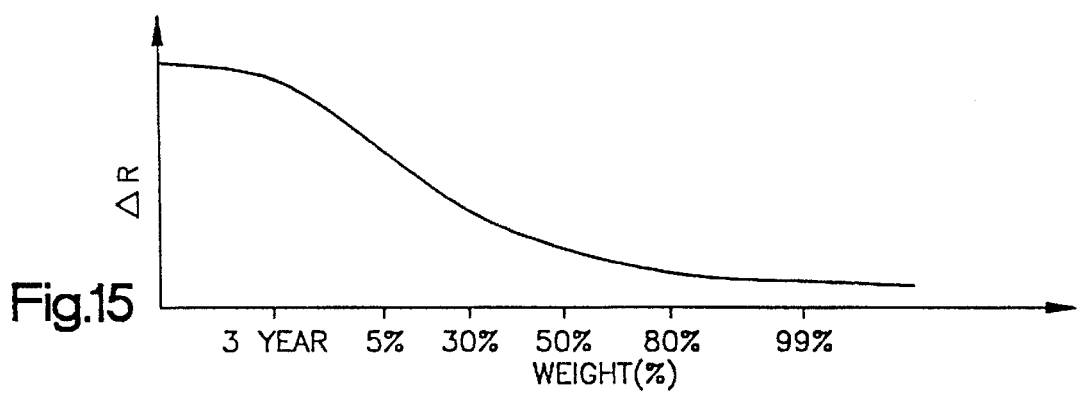
FIG. 15 is a graph of the change of resistance of the weight sensor as a function of the weight of the occupant.
Figure 16:
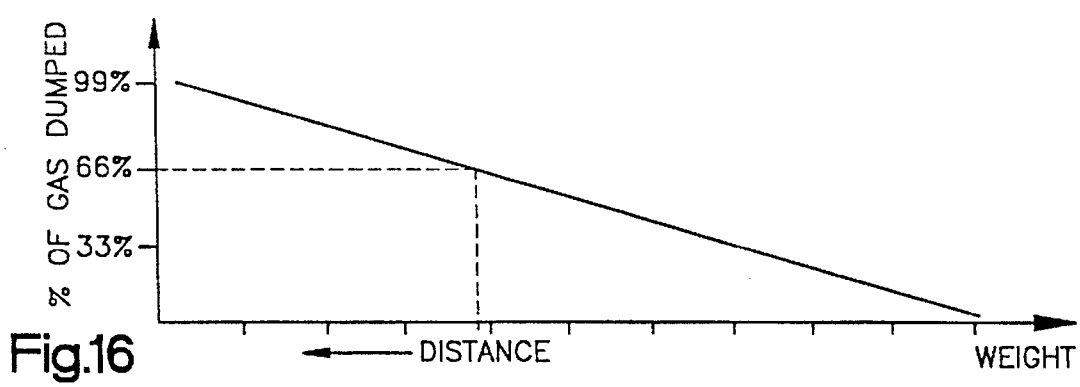
FIG. 16 is a graph of the percentage of gas discharged from the airbag shown in FIG. 9 as a function of distance between the occupant and the dashboard or as a function of the weight of the occupant.

For purposes of designing and evaluating occupant restraint systems, industrial standards have been established to model, on a theoretical basis, the population as a whole. These standards define theoretical individuals in terms of overall weight, height, torso length, and various other anatomical characteristics. Based on actual measurements of one of these characteristics, such as weight, other characteristics of a vehicle occupant can be assumed, with a predetermined statistical probability of correctness, from the industrial standards. FIG. 15, for example, correlates changes in resistance of the film 330 to weights of theoretical males in these industrial standards. For example, a 95th percentile (denominated 95% in FIG. 15) male weighs 220 lbs., a 50th percentile male weighs 165 lbs., and a 3 year old child weighs 30 lbs. The controller 250 controls the deployment of the airbag 226 based on the change in resistance of the film 330 and the computed weight of the occupant. Depending upon the weight of the occupant and his related theoretical anatomical dimensions, the airbag 226 is deployed in a crash condition at a time after the onset of a crash which is derived from, preferably, a look-up table. Data stored in the look-up table is derived from historical data and/or empirical testing. The detected weight of the occupant is also used by the controller 250, together with the position of the occupant, to control the vent valves 238, 239. FIG. 16 is a multipurpose depiction of the control of the vent valves 238, 239. First, FIG. 16 depicts a percent of the gas dumped through the vent valves as a function of the determined weight of the occupant. The lighter the occupant sitting in the seat 234, the larger the percentage of gas from the gas sources 232, 233 which should be diverted away from the airbag 226 and dumped. Second, FIG. 16 depicts a percent of gas dumped through the vent valves as a function of the position of the occupant in the seat. The closer the occupant is to the cover 230, the larger the percentage of gas that should be dumped from the gas sources 232, 233. The amount of gas dump required for weight and distance are based from historical data including empirically determined data.

The controller 250 further uses the occupant's weight to control whether one or both squibs are fired during a vehicle crash requiring deployment of the airbag. For example, if the occupant weight is determined to be less than a 50th percentile person, only one of the squibs 254, 255 may be fired. If the occupant weight is determined to be greater than a 50th percentile person, both of the squibs may be fired.

The controller 250 monitors the distance between the occupant and the front cover 230 of the airbag assembly 222. This distance is determined by knowing the position of the seat 234 from the seat position sensor 272, the incline of the seat back from the sensor 270, and the position of the occupant in the seat 234 based upon the output signals from sensors 260 and 266. A determination is made as to whether the occupant is at a location relative to the airbag assembly for which the airbag would not provide effective protection in a crash condition. If it is determined that an occupant is sitting at this ineffective protection location, the airbag is not deployed upon a vehicle crash condition. The control of firing one or two squibs can also be controlled in response to the sensed position of the occupant.

Figure 17:
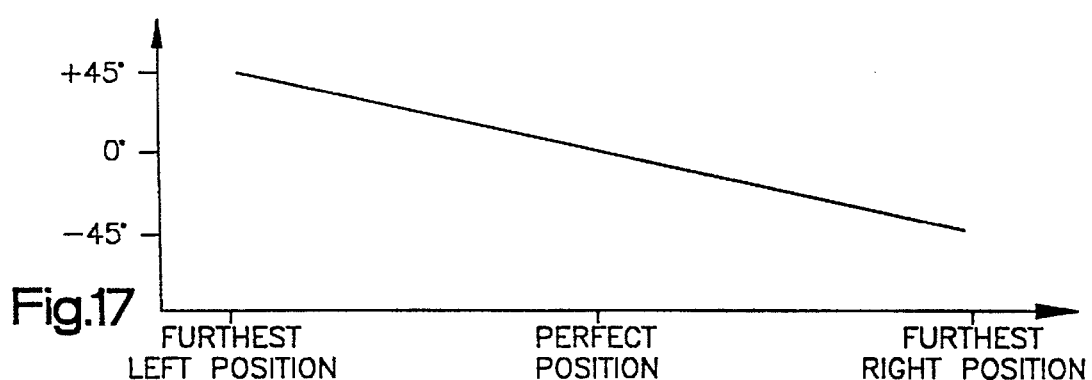
FIG. 17 is a graph depicting the angular position of the airbag shown in FIG. 9 as a function of the occupant leftward and rightward position in the vehicle seat.
Figure 18:
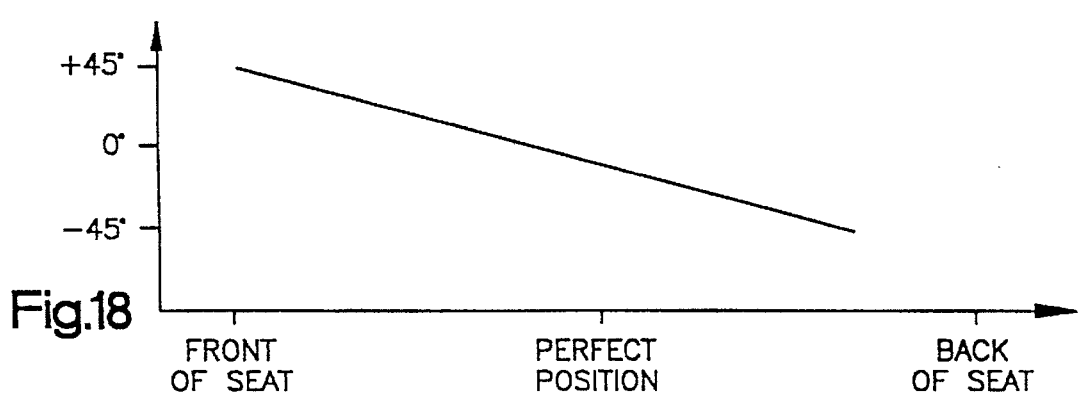
FIG. 18 is a graph depicting the angular position of the airbag show in FIG. 9 as a function of the occupant forward or rearward position in the vehicle seat.

FIGS. 17 and 18 graphically depict orientation or aiming control for the airbag assembly 222 left/right and up/down, respectively. If it is determined that the occupant is sitting in the left portion of the seat from the position sensors 300, the airbag assembly 222 is rotated to the left. If it is determined that the occupant is sitting in the right portion of the seat from the position sensors 300, the airbag assembly 222 is rotated to the right. If it is determined that the occupant is sitting in the front portion of the seat from the position sensors 300, the airbag assembly 222 is rotated upward. If it is determined that the occupant is sitting in the back portion of the seat from the position sensors 300, the airbag assembly 222 is rotated downward.

The aiming or orientation of the airbag assembly 222 is controlled through the motor drive control 282. The motor drive control 282 is a stepper motor controller with the motors 240, 242 preferably being stepper motors. The controller 250 outputs a horizontal position control, including a horizontal step input and a direction enable input. The controller 250 outputs a vertical position control, including a vertical step input and a direction enable input. Based upon these input signals from the controller 250, the motor controller 282 outputs the appropriate drive signals to the motors 240, 242 in a manner well known in the art.

The sensor 264 in the seat cushion 262 is a piezoelectric film of the type that detects infrared energy. When an occupant sits in the seat 234, he gives off infrared energy which is sensed by the sensor 264. This sensor then provides a signal indicative of whether the object in the seat 234 is animate or inanimate. The sensor 264 is connected to the controller 250. If, during a crash condition, an inanimate object is on the seat cushion, the airbag 226 is not deployed.

Figure 19:
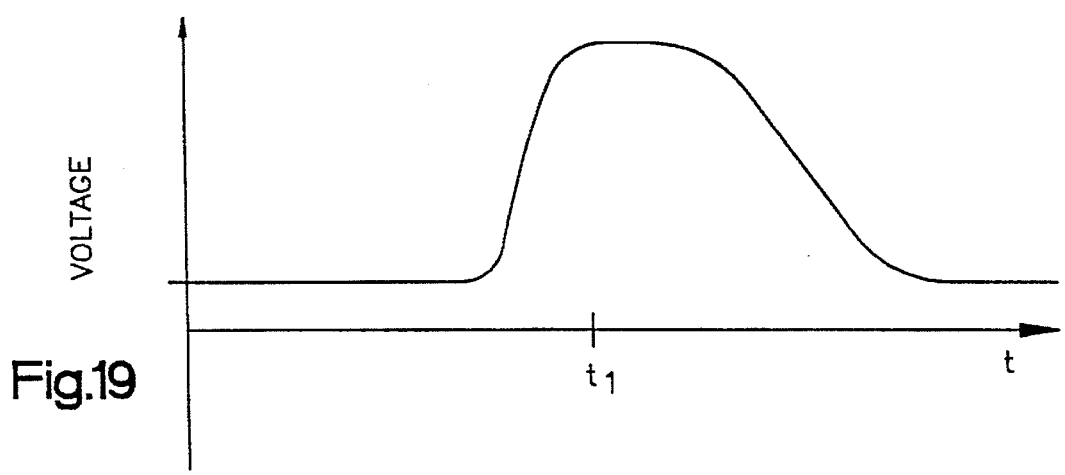
FIG. 19 is a graphical representation of the output of the humanistic sensor shown in FIG. 9.

FIG. 19 depicts the output from the sensor 264. The output from the infrared sensor is a voltage having a value indicative of the change in temperature to which it is subjected. When the controller 250 monitors a large voltage from the sensor 264, such indicates that an animate object is sitting in the seat. The graph depicts an occupant sitting on the seat at time $t_1$.

The seat back sensor 266 is preferably a piezoelectric sensor identical in structure to the sensors 60 and 300 and can either be a single sensor or an array. The sensor 266 is connected to the controller 250 and provides an indication as to whether the occupant is seated all the way back in the seat 234. The contact arm for the sensor 266 is located much closer to its associated film layer so that only a small amount of force is required against the back of the seat to effect a change in the condition of the electrical characteristic of the film.

Referring to FIG. 12, the controller 250, in this array embodiment, is preferably a microcomputer separately connected to the output of each of the sensors 300, 302, 270, 272, 264 and 266. The outputs of the microcomputer are connected to the individual squibs 254, 255. The microcomputer's outputs are also connected to the vent valves 238 and 239, as well as the motor drive control 282.

Figure 20:
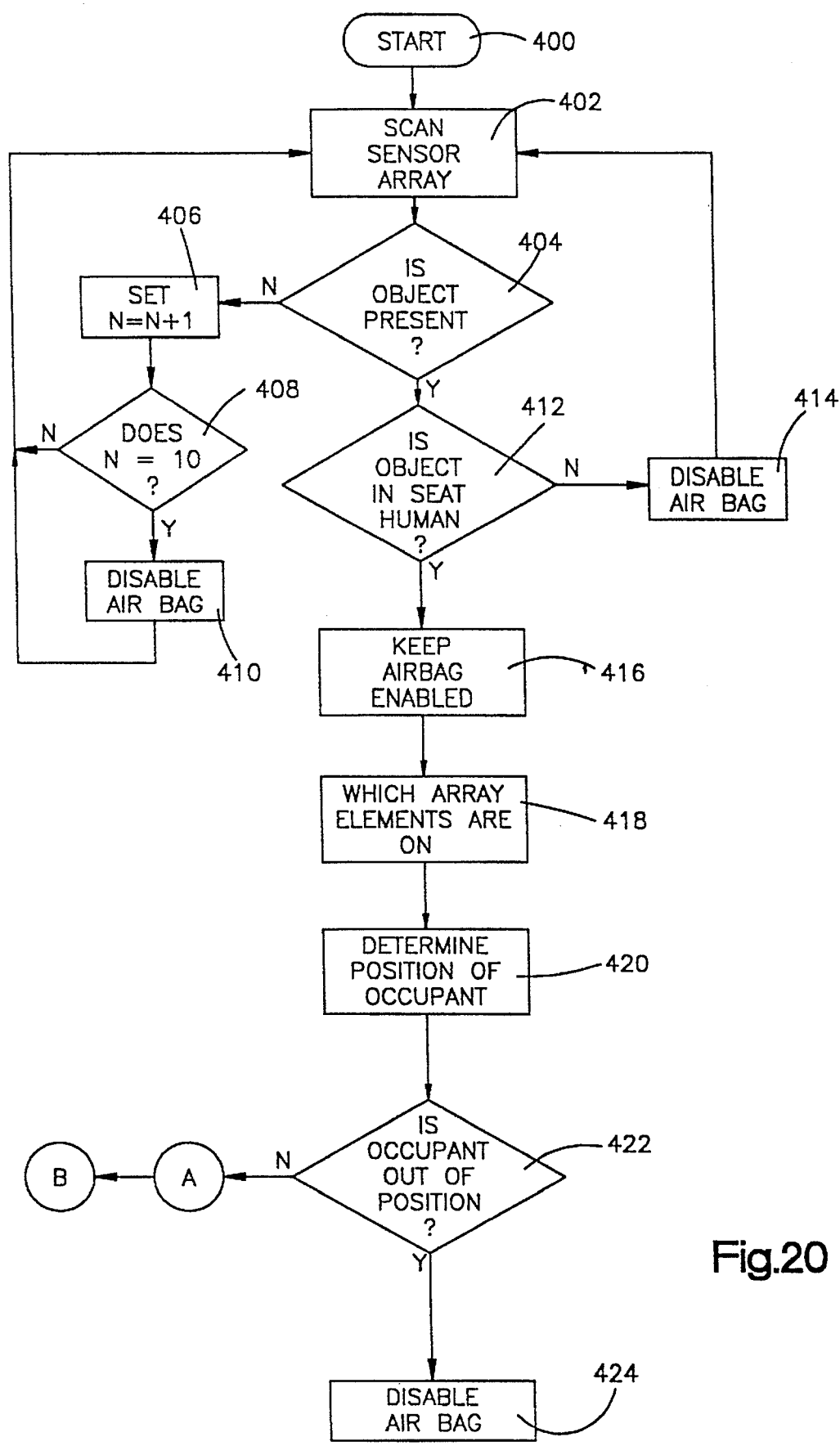
FIGS. 20–22 are flow charts depicting the control process followed by the controller shown in FIG. 9.
Figure 21:
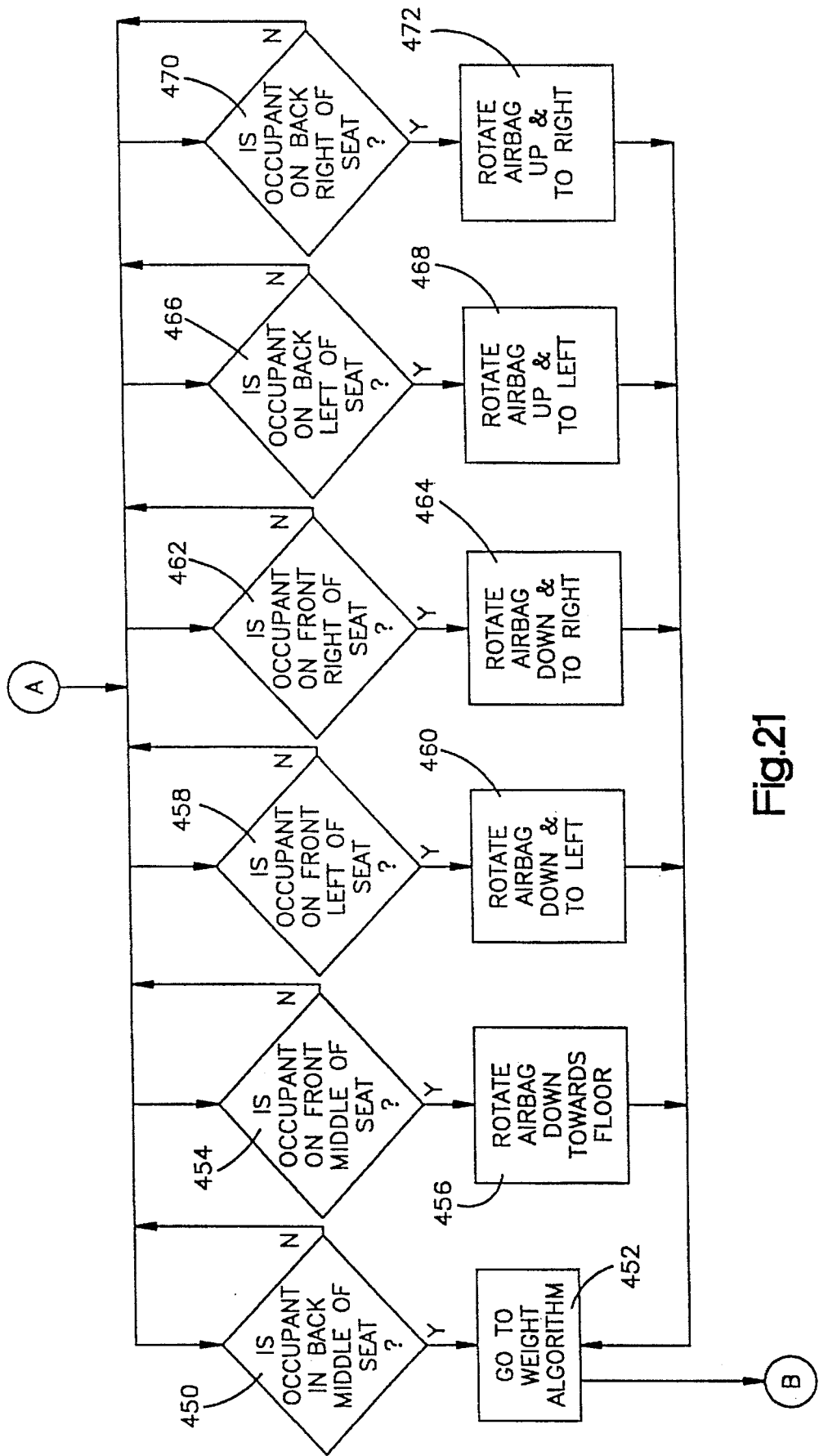
Figure 22:
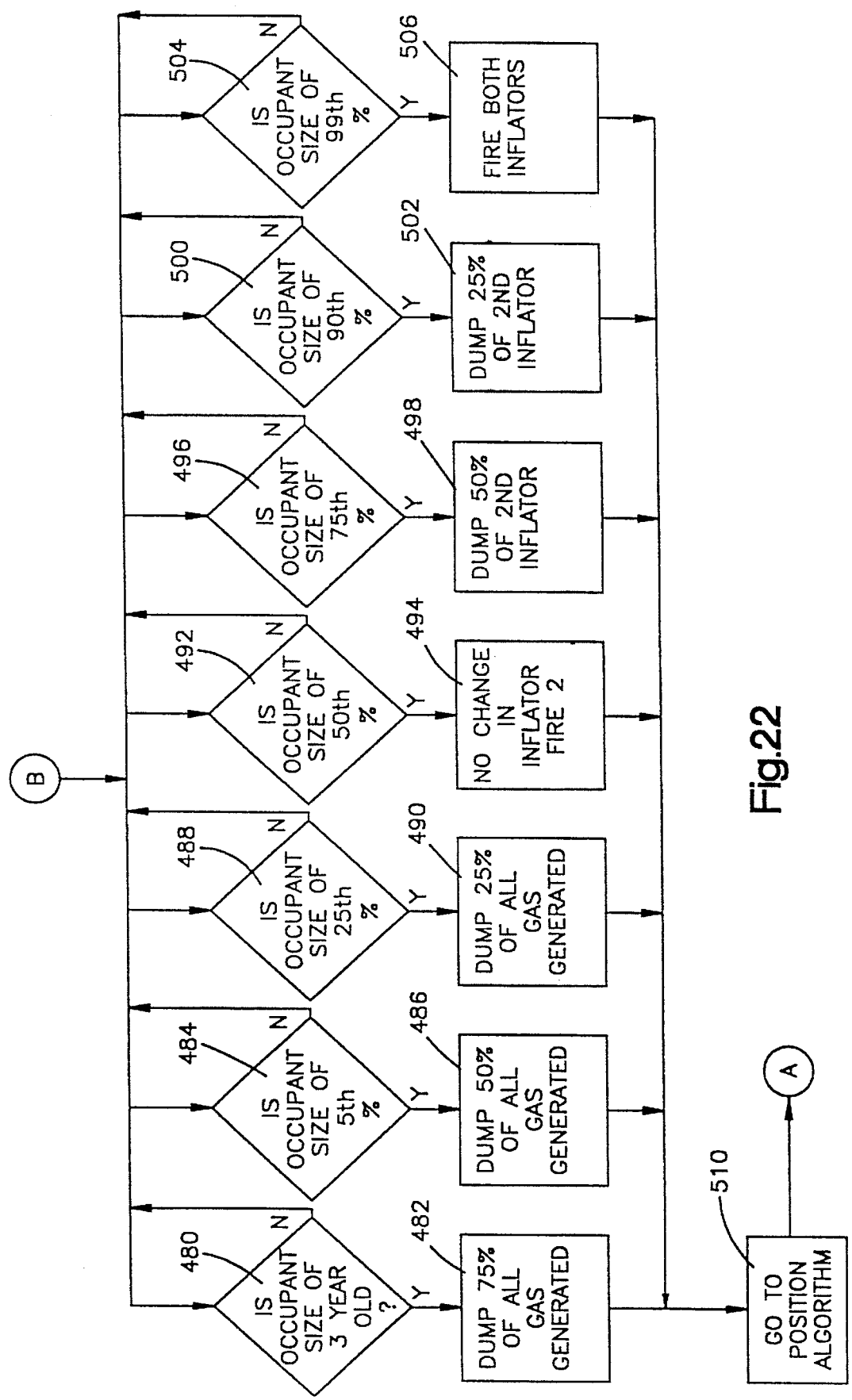

FIGS. 20-22 provide a flow chart for the control process followed by the controller 250. In step 400 the controller 250 is initialized by setting numbers used in the process to zero, resetting flags where applicable, initially enabling the airbag, and initially aiming the airbag to a middle position. In step 402, the sensor outputs are scanned by the microcontroller. In step 404, a determination is made as to whether an object is present in the seat. For the embodiment shown in FIG. 9, any of the sensors 300, 302, or 264 can be used to determine if an occupant is present. The sensors 300, 302 and 264 provide an indication of whether an object is in the seat independent of whether the object is animate or inanimate.

If the determination in step 404 is negative, the process proceeds to step 406 where a value N is set equal to N+1. The process proceeds to step 408 where a determination is made as to whether N is equal to 10. The first determination in step 408 is negative since N was set equal to zero in step 400. The process then loops back to step 402. After 10 times through steps 402, 404, 406, 408, the determination in step 408 is affirmative. When the determination in step 408 is affirmative, the process proceeds to step 410 where the airbag is disabled. The process then loops back to step 402.

If the determination in step 404 is affirmative, the process proceeds to step 412 where a determination is made as to whether or not the object in the seat is a human. This is done by monitoring the output of the sensor 264. If the determination in step 412 is negative, the process proceeds to step 414 where the airbag is disabled.

If the determination in step 412 is affirmative, the process proceeds to "step" 416 where the airbag is kept in an enabled condition. This "step" is non-functional and is shown in the flow chart as a reminder that the airbag is maintained enabled at this point in the process. The process proceeds to step 418 where the controller 250 determines which of the sensors 300 in the array 260 are ON. The position of the occupant is then determined in step 420 from the ON sensors in the array 260.

A determination is then made in step 422 as to whether the occupant in the seat is out of position. Out of position means that the occupant is in a position for which the airbag can not provide effective protection during a crash condition. If the determination in step 422 is affirmative, the process proceeds to step 424 where the airbag is disabled.

If the determination is step 422 is negative, which means that the occupant is located in the seat 234 in a location in which the airbag would provide effective crash protection, the process proceeds to step 450 (FIG. 21) where a determination is made as to whether the occupant is sitting in the back middle of the seat. If the determination in step 450 is affirmative, the process proceeds to step 452 where the weight of the occupant is determined. By the occupant being in the back middle of the seat 234, the airbag does not need further aiming since it was set to a middle position in step 400.

If the determination in step 450 is negative, the process proceeds to step 454 where a determination is made as to whether the occupant is sitting in the front middle of the seat. If the determination in step 454 is affirmative, the process proceeds to step 456 where the airbag assembly 222 is rotated down toward the floor. The process then proceeds to step 452.

If the determination in step 454 is negative, the process proceeds to step 458 where a determination is made as to whether the occupant is sitting in the front left of the seat. If the determination in step 458 is affirmative, the process proceeds to step 460 where the airbag assembly 222 is rotated down and to the left. The process then proceeds to step 452.

If the determination in step 458 is negative, the process proceeds to step 462 where a determination is made as to whether the occupant is sitting in the front right of the seat. If the determination in step 462 is affirmative, the process proceeds to step 464 where the airbag assembly 222 is rotated down and to the right. The process then proceeds to step 452.

If the determination in step 462 is negative, the process proceeds to step 466 where a determination is made as to whether the occupant is sitting in the back left of the seat. If the determination in step 466 is affirmative, the process proceeds to step 468 where the airbag assembly 222 is rotated up and to the left. The process then proceeds to step 452.

If the determination in step 466 is negative, the process proceeds to step 470 where a determination is made as to whether the occupant is sitting in the back right of the seat. If the determination in step 470 is affirmative, the process proceeds to step 472 where the airbag assembly 222 is rotated up and to the right. The process then proceeds to step 452. If the process in step 470 is negative, the process returns to step 450.

After the position of the occupant is determined from the process depicted in FIG. 21, the process proceeds to step 452 where the occupant's weight is determined. The process proceeds to step 480 where a determination is made, based on the occupant's weight, as to whether the occupant is approximately the size of a theoretical 3 year old. This determination, as well as the other weight-based determinations described hereafter, will be based on the determined weight of the occupant being within a range of weights, rather than equal to a specific weight. If the determination is affirmative, the process proceeds to step 482 where 75% of all gas discharged by one gas source is dumped via its associated vent valve. The other gas source is not actuated. From a negative determination in step 480, the process proceeds to step 484.

In step 484, a determination is made as to whether the occupant is the size of a 5th percentile person. If the determination is affirmative, the process proceeds to step 486 where 50% of all gas discharged by one gas source is dumped via its associated vent valve. The other gas source is not actuated. From a negative determination in step 484, the process proceeds to step 488.

In step 488, a determination is made as to whether the occupant is the size of a 25th percentile person. If the determination is affirmative, the process proceeds to step 490 where 25% of all gas discharged by one gas source is dumped via its associated vent valve. The other gas source is not actuated. From a negative determination in step 488, the process proceeds to step 492.

In step 492, a determination is made as to whether the occupant is the size of a 50th percentile person. If the determination is affirmative, the process proceeds to step 494 where the gas discharged by one gas source is not dumped at all. The other gas source is not actuated. Any weight detected greater than a 50th percentile person results in actuation of the second gas source. From a negative determination in step 492, the process proceeds to step 496.

In step 496, a determination is made as to whether the occupant is the size of a 75th percentile person. If the determination is affirmative, the process proceeds to step 498 where 50% of the gas discharged by the second gas source is dumped via its associated vent valve. From a negative determination in step 496, the process proceeds to step 500.

In step 500, a determination is made as to whether the occupant is the size of a 90th percentile person. If the determination is affirmative, the process proceeds to step 502 where 25% of the gas discharged by the second gas source is dumped via its associated vent valve. From a negative determination in step 500, the process proceeds to step 504.

In step 504, a determination is made as to whether the occupant is the size of a 99th percentile person. If the determination is negative, the process loops back to step 480. If the determination is affirmative, the process proceeds to step 506 where no gas is dumped from either of the gas sources. From any of the steps 482, 486, 490, 494, 498, 502, or 506, the process proceeds back to step 510 which is a determination of the occupant's position shown in FIG. 21.

It should be appreciated that the various steps for weight and position determination can occur in any order. Also, the weight determinations and vent valve adjustments can be made in smaller increments, if desired. Further, the occupant's position can be determined and then the process would branch to the appropriate action based upon that determined position. Similarly, the occupant's weight can be determined and the process would branch to the appropriate action based upon that determined weight.

Figure 23:
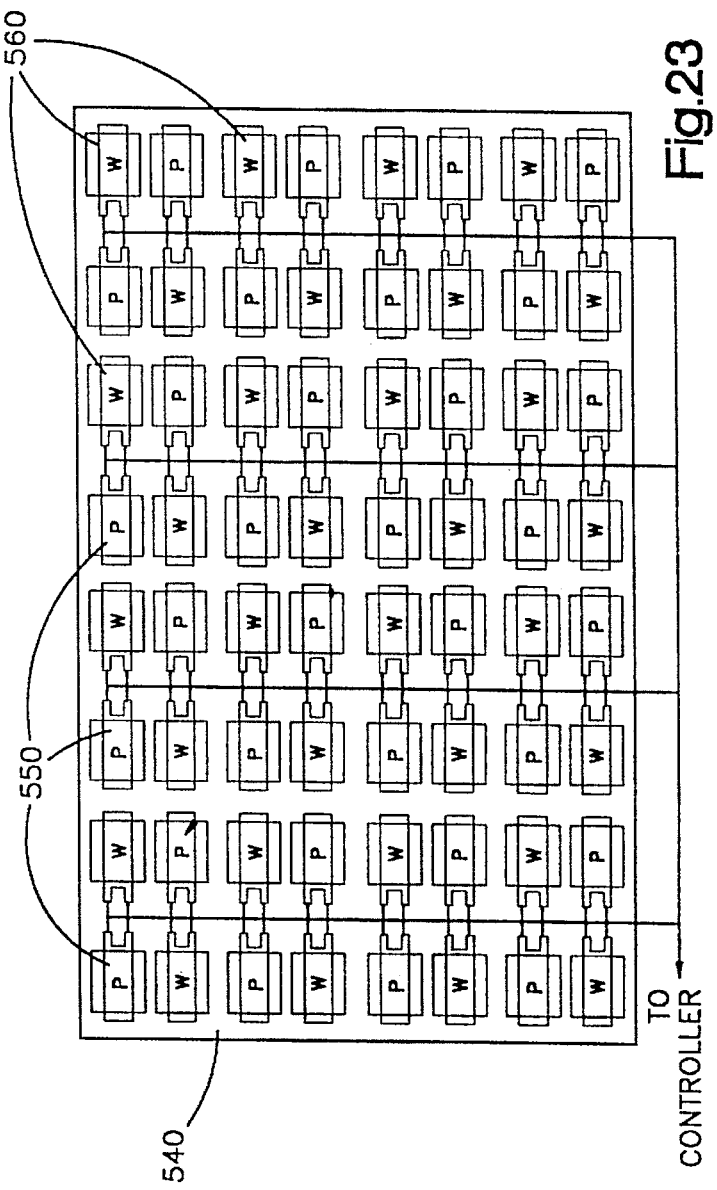
FIG. 23 is a top plan view of a position and weight sensor in accordance with another embodiment of the present invention.

FIG. 23 shows another embodiment of the present invention. In this embodiment, a plurality of piezoelectric film sensors 550 are secured to a rubber pad 540 and provide an electric pulse when deflected due to the weight of the occupant on the seat cushion. By monitoring which films 550 provide an electric pulse, position of the occupant can be determined. Weight sensors 560 are also secured to the rubber pad 540 and provide an indication of the occupant weight which is functionally related to the amount of film flexure. The position sensors 550 and weight sensors 560 are located on the rubber pad in a checker-board pattern as described above. The rubber pad is located in the seat cushion at a location which permits flexure of the pad in response to weight and position of the occupant. The controller in this embodiment processes the signals from the weight film sensors in the same manner as described above. The controller monitors the seat position sensors and determines the occupant's position in response to which position films provide a pulse output. The airbag deployment and direction are controlled as described above.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. An occupant sensing apparatus for use in an occupant restraint system, comprising:

a film having an electrical characteristic with changeable states;

means for mounting said film in a vehicle seat so that presence of an occupant on said seat effects deformation of said film, deformation of said film effecting a change in a state of said electrical characteristic of said film;

electric circuit means connected to said film for providing a first signal when said film characteristic is indicative of an occupant not being present, a second signal when said film characteristic is indicative of an occupant being present, and a third signal if a fault condition is monitored; and means for enabling the occupant restraint system when said electric circuit means either monitors a film characteristic indicative of an occupant being present or a fault condition.

2. The apparatus of claim 1 wherein said film is a force sensitive resistor film.

3. The apparatus of claim 1 wherein said film is a piezoelectric film.

4. The apparatus of claim 1 wherein said mounting means includes an elastomeric pad.

5. The apparatus of claim 1 wherein said mounting means includes a contact member.

\* \* \* \* \*